Oct. 20, 1970   J. F. HINRICHS ET AL   3,535,487
ELECTRON BEAM WELDING APPARATUS
Filed March 18, 1968   2 Sheets-Sheet 1
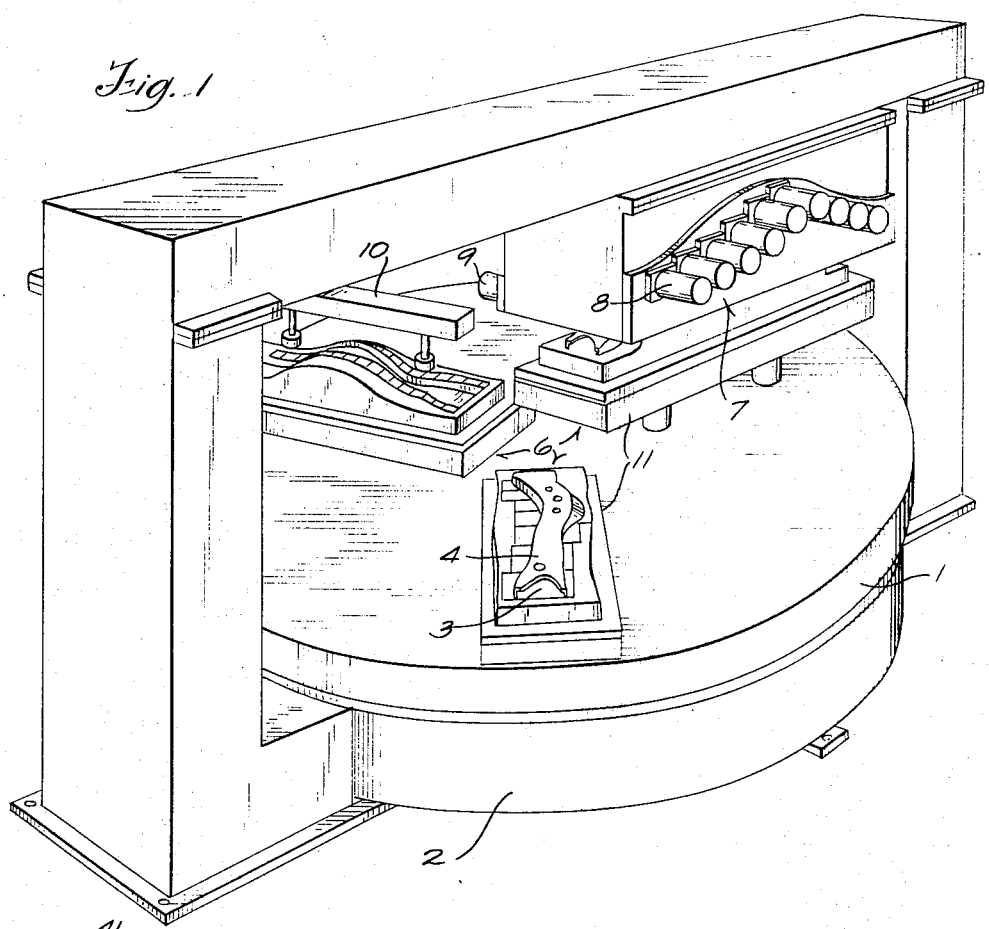
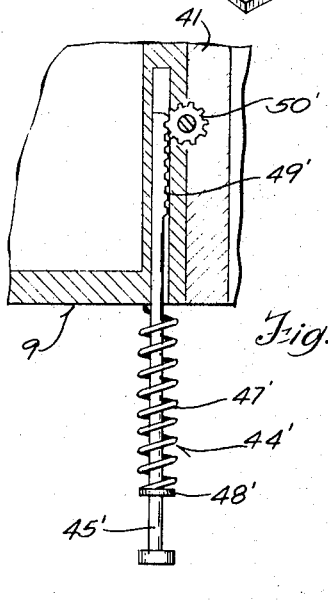
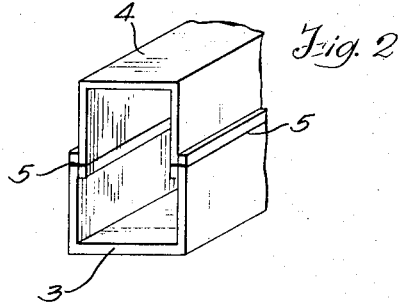
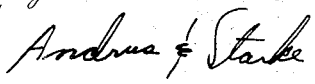

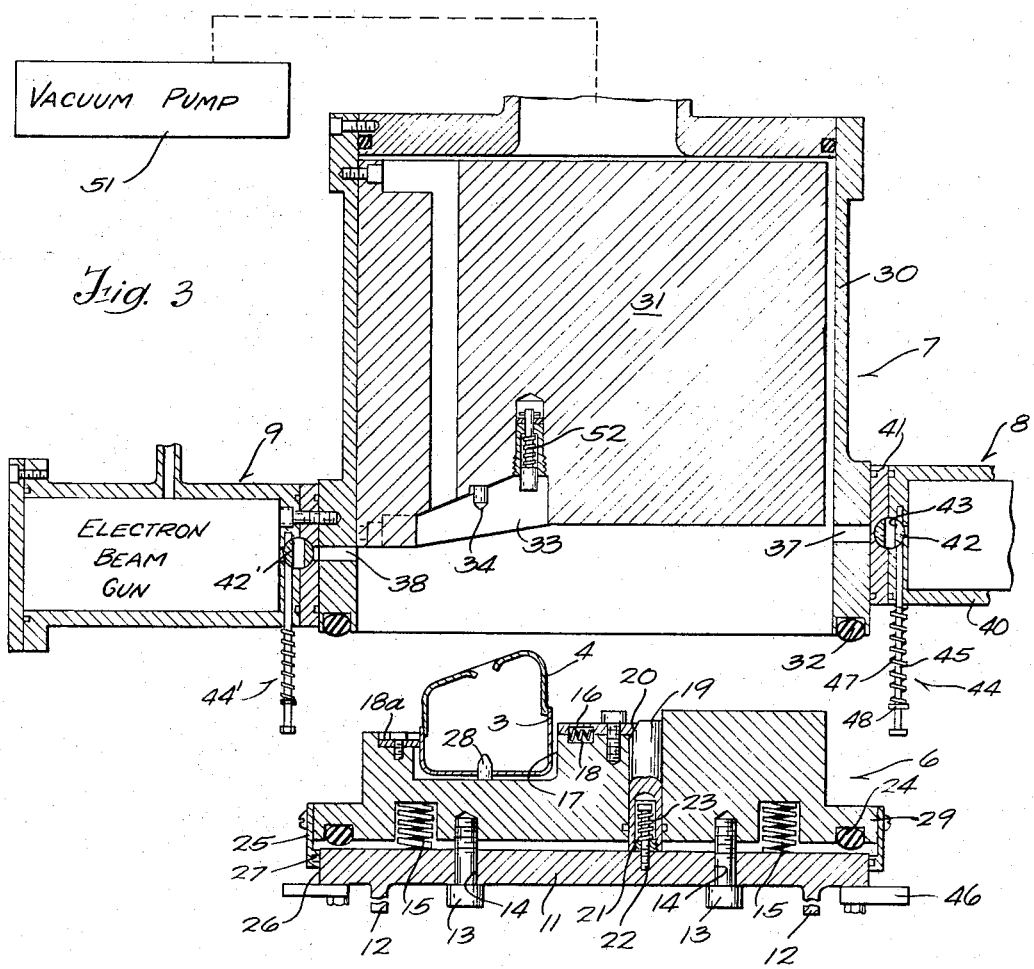
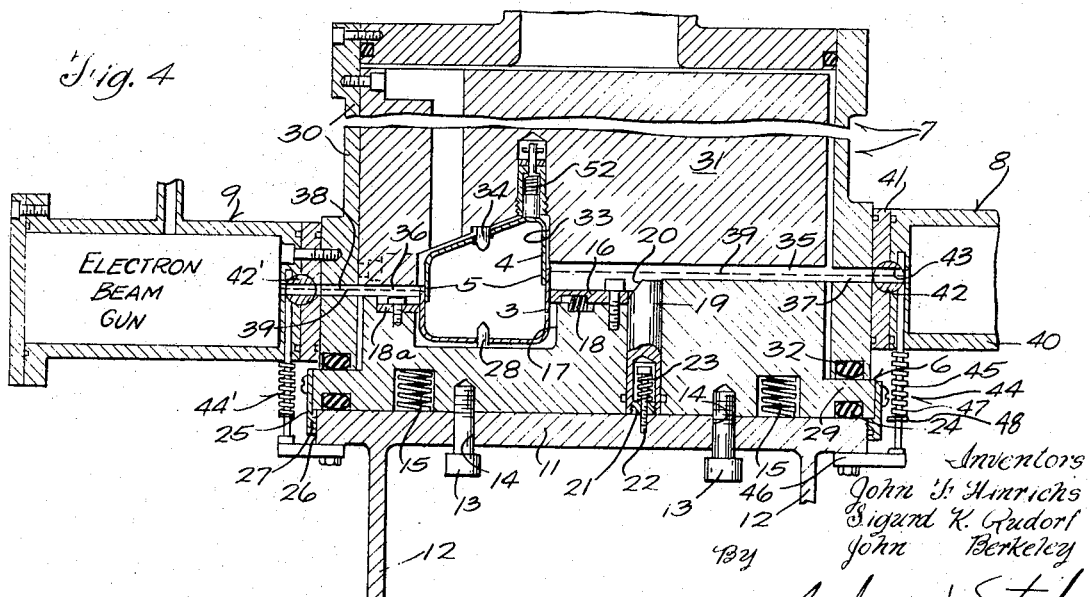

United States Patent Office 3,535,487
Patented Oct. 20, 1970

---

3,535,487
ELECTRON BEAM WELDING APPARATUS
John F. Hinrichs, Menomonee Falls, and Sigurd K. Rudorf, West Bend, Wis., and John P. Berkeley, Monterrey, Nuevo Leon, Mexico, assignors to A. O. Smith Corporation, Milwaukee, Wis., a corporation of New York
Filed Mar. 18, 1968, Ser. No. 713,598
Int. Cl. B23k 15/00
U.S. Cl. 219—121                                         5 Claims

ABSTRACT OF THE DISCLOSURE

A multiple station rotating table supports a plurality of similar lower die members moving between a loading station and a welding station. A complementing upper die member is provided at the welding station to enclose the components to be welded as the result of closing the die members. The die cavities closely enfold the workpiece in the closed position and thus define a small volume chamber or cavity surrounding the total workpiece. The welding cavity is interconnected to a suitable pumping mechanism to establish the desired welding vacuum. The welding cavity is separated from a plurality of electron beam welding guns by a valve such that the desired high vacuum can be maintained on the welding gun proper and a much smaller vacuum established within the welding chamber immediately prior to the opening of the main valve and the establishment of the welding beam. From the welding station, the welded part may be automatically or manually removed and transferred to a conveyor.

The lower die members are mounted on lifting platens forming a part of the dial feed rotary table and automatically raised at the welding station into contact with the upper die member. The die members are spring-loaded such that after contact between the lower and upper dies the lifting platen is able to travel a short additional distance. The additional travel is employed to actuate clamping bar means which move laterally to engage the side of a member and firmly hold the overlapped edges to be welded and to seal the chamber.

---

This invention relates to an electron beam welding apparatus and particularly to a production-type machine for the rapid loading and positioning of components into a special electron beam welding chamber.

Electron beam welding has very substantial advantages from the standpoint of ease of welding, the appearance and character of the final weld and the like when compared to the more conventional arc welding processes presently employed in the fabrication of metal parts. However, the production application of electron beam welding presents unique problems from the standpoint of proper location of the work and the rapid assembly of the workpieces in proper relationship for placement within an electron beam welding apparatus. The copending applications of John Hinrichs entitled "Rapid Load System for Electron Beam Welder," Ser. No. 607,777, filed Jan. 1, 1967; and "Electron Beam Welding of Rimmed Carbon Steel," Ser. No. 607,826, filed Jan. 1, 1967 disclose suitable apparatus for particular electron beam welding processes. The Hinrichs application particularly discloses an advantageous welding process wherein the electron beam gun is separated from the welding chamber by a suitable valve means. The electron beam gun is held under a very substantial vacuum while the welding chamber is subjected to a much more reasonable vacuum requirement. The present invention is particularly directed to a multiple station transfer device employing electron beam welding means. Generally, in accordance with the present invention, the welding station includes a pair of relatively moveable dies having die cavities which closely enfold the workpiece in the closed position and thus define a small volume chamber or cavity surrounding the total workpiece. The welding cavity is interconnected to a suitable pumping mechanism to establish the desired welding vacuum. The welding cavity is separated from the electron beam welding gun or guns by a suitable valve means such that the desired high vacuum can be maintained on the welding gun proper and a much lesser vacuum established within the welding chamber immediately prior to the opening of the main valve and the establishment of the welding beam. The minimum volume permits reducing of the vacuum to a welding level in a reasonable time. The welding apparatus is formed as an integral part of a multiple station rotating table or work device having a plurality of similar die members moving between a loading station and a welding station. The welding station includes a complementing die member to enclose the components to be welded as the result of closing the die members. From the welding station, the welded part may be automatically or manually removed and transferred to a conveyor.

In accordance with the present invention, lower die members are mounted on lifting tables forming a part of a transfer or dial feed rotary table. The lifting platens are automatically actuated in the welding station to raise the lower die assembly into contact with the upper die assembly. The dies proper are spring-loaded such that after contact between the lower and upper dies, the lifting table is able to travel a short additional distance. The additional travel is employed to actuate suitable clamping means to interengage the workpiece or edges to be welded.

The drawings furnished herewith illustrate a preferred construction of the present invention in which the above advantages and features are clearly disclosed as well as others which will be clear from the following description.

In the drawing:
FIG. 1 is a pictorial illustration of an electron beam welding apparatus constructed in accordance with the present invention;
FIG. 2 is a perspective view of a welded frame member;
FIG. 3 is an enlarged vertical section through the welding station with the upper and lower die section separated;
FIG. 4 is a view similar to FIG. 3 with die sections closed; and
FIG. 5 is a small enlarged fragmentary view of an actuating mechanism shown in FIGS. 3 and 4.

Referring to the drawings and particularly to FIG. 1, the illustrated embodiment of the invention includes a table 1 rotatably mounted on a supporting base structure 2. The table 1 rotates between a work or a loading station, a welding station and an unloading station circumferentially distributed about the table.

The illustrated embodiment of the invention is adapted to weld a pair of channel-shaped frame members 3 and 4. Each of the frame members 3 and 4 is generally of a U-shaped cross section with the upper member 4 telescoped slightly into the lower member 3, as most clearly shown in FIGS. 2 and 3. The members 3 and 4 are to be welded along the overlapped welded edges as at 5. The table 1 includes three similar lower dies 6 adapted to receive the pair of telescoped frame members 3 and 4. In operation, the frame members 3 and 4 are manually disposed into the lower die 6 at the loading station. The table 1 is indexed to align the loaded die 6 with an upper die 7 at the welding station. The lower die 6 is automatically raised into sealing engagement with the upper die 7 and a plurality of similar banks of electron beam guns 8 and 9 which are mounted to opposite sides of die 7 are actuated in proper sequence to complete the longitudinal weld 5 along the opposite sides of the assembled frame members 3 and 4. While the one weld is being made, the operator manually loads a second assembly of frame members 3 and 4 into the lower die 6 which has been indexed into alignment with the loading station. After the welding operation, the raised die 6 is again lowered and the table 1 indexed to dispose the welded frame members of the unloading station where a suitable lifting device 10 or other unloading device is provided to automatically transfer the welded frame members to any suitable conveying mechanism, not shown.

The detail of the illustrated upper and lower dies are more clearly shown in FIG. 3 of the drawing. As shown in FIG. 3, the lower die 6 is secured to a vertically movable lifting table 11 having a pair of depending guide and lift arms 12 projecting downwardly through the supporting base structure 2. The lower die 6 is secured to the table 11 by a pair of clamping bolts 13 which project upwardly through suitable openings 14 in the lift table 11 and thread into the lower end of the die 6. The shank of the clamping bolts 13 is somewhat greater in length than thickness of the table 11. A plurality of springs 15 are disposed within recesses in the underside of the die 6 and continuously urge the die upwardly with the heads of the bolts 13 engaging the underside of the lift table 11.

In operation, the raising movement of arms 12 first moves the lower die 6 into the upper die 7. When the initial contact is made between the lower and upper dies, the movement of the lower die is essentially arrested. The lifting table 11, however, is able to continue upward travel for a short additional distance by compressing of springs 15 to actuate a plurality of wedge actuated clamping blocks or jaws 16 which are slidably mounted within die 6 to one side of a die cavity 17. The blocks 16 are shown slidably mounted within a recess in the top surface of the lower die 6 with a small coil spring 18 in a chamber defined by mating recesses in the underside of the clamping block or jaw 16 and the adjacent surface of the die 6.

The clamping blocks 16 are thus disposed below the line of the weld 5 and adapted to engage the adjacent arm portion of a frame member 3 disposed within cavity 17. A plurality of fixed clamping blocks 18a are secured in a top recess to the opposite side of die cavity 17. The clamping blocks 16 are moved laterally into engagement with the member 3 by clamp actuators 19 to clamp the lip or overlapped portions of the workpieces tightly together.

The clamp actuators 19 are shown as suitable rods or shafts slidably mounted within vertical openings. The upper end of the clamping actuators are chamfered as at 20 and mate with the spring loaded sliding clamping block 16 extending laterally therefrom.

In the illustrated embodiment of the invention, the clamp actuator 19 has its lower end recessed or tapped and closed by a locating nut 21. An interconnecting bolt 22 extends through the internal locating nut 21 and threads into the lift table 11 with a coil spring 23 disposed between the head of the bolt and the nut within the recess in the clamp actuator 19.

Therefore, after the die 6 engages die 7, the upward movement of table 11 compress the springs 15 to close the gap between the die 6 and table 11. The actuators 19 move upwardly through the die with chamfered surface 20 forcing the blocks 16 laterally into clamping engagement with the frame 3, as shown in FIG. 4.

The undersurface of the lower die 6 is provided with a recess within which an O-ring seal 24 is disposed. With the table 11 raised, the O-ring seal 24 engages the adjacent top surface of the lift table 11 and establishes a hermetic joint. Additionally, a small encircling depending plate 25 is secured to the outer periphery of the lower die 6 and projects downwardly into generally sliding engagement with the peripheral edge 26 of the lift table 11. The lower end of the bracket is recessed to receive an O-ring seal 27 which engages the peripheral edge of the lift table to provide a fluid-tight seal at that point.

The upper surface of the die 6 includes the generally U-shaped cavity 17 corresponding to the general configuration of the lower frame member 3. Locating pins 28 are provided in the base of the cavity 17 to properly locate the lower cup-shaped frame members 3 in cavity 17 for movement with respect to the opposite or upper die 7. The die 6 moves into die 7 and includes an encircling flange 29 which presents a top sealing surface to the adjacent portion of the upper die 7 and thereby defines a sealed welding chamber, as hereinafter described.

Th upper die 7, as shown most clearly in FIG. 3, includes an outer tubular housing 30 projecting downwardly of a die body 31 to define a tubular extension which telescopes over the raised lower die 6. The bottom end of the housing 30 is provided with a recess within which an O-ring seal 32 is disposed to establish a vacuum-tight joint in response to the raising movement of the lower die 6. The die body 31 is generally a block-like member bolted or otherwise secured within the housing 30 and having a frame cavity 33 aligned with and generally complementary to the chamber or cavity 17 in the lower die 6. The cavity 33 in the upper die 7 generally conforms to the corresponding configuration of the upper frame member 4 and includes suitable depending locating pins 34. The upper die 7 further is spaced from the lower die 6 by a predetermined amount to the opposite sides of the aligned cavity as at 35 and 36 in alignment with the line of weld 5 to define a welding beam passageway to the opposite sides of the assembled frame members.

Electron beam guns 8 and 9 are mounted to the opposite sides of the upper die 7 and particularly the housing 30. As particularly shown in FIG. 1, the welding station includes the plurality of electron beam guns 8 and 9 secured to the opposite sides of a housing 20 and generally disposed in an array corresponding to the weld line 5. The housing 30 and guns 8 and 9 include welding beam passageways or openings 37 and 38 in alignment with the passageways 35 and 36.

The electron beam guns 8 and 9 are of any suitable or desired construction adapted to establish a welding beam 39 such as disclosed in the copending application of John Hinrichs and no further detailed description thereof, other than the description of the mounting to the upper die 7, is required. The mounting of a gun 8 is described in detail with corresponding elements for gun 9 identified by similar primed numbers for simplicity and clarity of explanation.

The guns 8 each include a housing 40 which is secured to a common mounting plate 41 to the one side of the housing 30. A rotary gate valve 42 is disposed in the passageway 37 of the electron beam gun 8 and the valve 42 includes an orifice 43 adapted to be rotated into alignment with the passageway 37 to complete the opening from the gun 8 to the overlapped edges or line of weld 5 when welding is to be accomplished. In the illustrated embodiment of the invention, a rack and pinion drive 44 is provided for opening and closing of the valve 42, as follows. A rod 45 is slidably mounted within the electron beam housing 40 and extends downwardly into bearing engagement on a bracket 46 secured to the lift table 11. A coil spring 47 encircles the rod between the electron beam housing 40 and a suitable support ring 48 on the lower end of the rod 45. The upper end of the rod 45 carries a rack 49 which meshes with a pinion 50 secured to the valve 40 between a pair of guns 8. The movement of rod 45 during the upward movement of the table 11 aligns the orifice 43 with the welding passageway 35 and the downward movement of table 11 releases rod 45 such that spring 47 rotates it 90 degrees to effectively seal the electron beam guns 8. In this manner, the main chamber of the electron beam gun 8 is separated from the welding cavity in the same manner as generally disclosed in applicant's copending application.

The welding chamber defined by the mating cavities 17 and 33 is connected to a suitable vacuum pump 51 through a passageway in the upper die 7 to permit complete evacuation of the welding chamber as well as the welding passageways 35 and 36. This cavity is maintained at a minimum practical volume to permit rapid dropping of the pressure to the necessary welding vacuum.

The upper die 7 is similar to a bell jar having a vacuum seal about the peripheral edge to permit the application of powerful pumping equipment to the top thereof.

The welding chamber is preferably connected to a vacuum pump 51 of excess pumping capacity in order to provide rapid evacuation of the cavity to the welding conditions. This is of importance in order to provide a practical solution in a commercial production line.

Additionally, the upper die 7 includes a spring-loaded ejector pin 52 slidably disposed in the upper die 7 in alignment with a portion of the frame member 4. When the lower die 6 is withdrawn, the ejector pin 52 moves downwardly to positively move the frame downwardly with the lower die 6.

Generally, the operation of the illustrated embodiment of the invention can be briefly summarized as follows.

The worker loads the preassembled lower frame member 3 and upper frame member 4 within the lower die 6 at the loading station. He then actuates a cycle control, not shown, which initiates the first sequence, namely, the rotation of the table 1 wih the loaded lower die 6 into alignment with the upper die 7 at the welding station. The loaded die 6 is automatically moved upwardly into the welding position with the final movement of the lower die 6 into the upper die 7 actuating the clamping wedges or blocks 16 to securely lock the assembled frame members 3 and 4 within the die assembly with the overlapping edges in firm contacting relationship. The final movement of the lift table 11 also results in the pivotal movement of the rotary valves 42 and 42' to open the welding passageways to the electron beam guns 8 and 9. The weld chamber or cavity is pumped down to the welding level immediately prior to or after actuation of the valves and the electron beam guns 8 and 9 simultaneously or sequentially fired to create the interconnecting weld line.

If the guns 8 and 9 are fired in sequence or cascade the number of power sources required for a multiplicity of guns will, of course, be substantially reduced.

During this welding operation, the operator has been loading the next part to be welded into the empty lower die 6 at the loading station. When the welding is completed which may take only a relatively few seconds, the lower die 6 retracts with respect to the upper die 7. When the operator next actuates the cycle control, the table 1 again rotates to align the newly loaded lower die 6 with the upper die 7 in the welding station and simultaneously align the welded box member with the unloading station. The automatic ejection or lift mechanism 10 removes the welded box member and places it on a suitable exit conveyor or the like, not shown.

Obviously, if desired, the loading might be automated and the unloading might be manually provided or any combination if so desired.

Further, as noted in applicant's copending application, the electron beam guns might be sequentially actuated and controlled through an automatic tape type control or the like with each beam sweeping a specified distance to define overlapping welds. Additionally, if desired, the device might be stitch welded whereby the weld line consists of a plurality of spaced weld spots or lines.

The present invention thus provides a practical solution to the provision of a production device for electron beam welding of parts of reasonable size.

Various modes of carrying out the invention are contemplated as being within the scope of the following claims particularly pointing out and distinctly claiming the subject matter which is regarded as the invention.

We claim:

1. An electron beam welding apparatus for welding telescoped workpieces along weld lines which extend along overlapped portions of the workpieces, comprising a movable work support having a plurality of spaced similar work receiving dies secured thereto with a work support cavity to receive the workpieces to be welded, a loading station for loading the workpieces in said dies and a welding station, said welding station including a die complementary to the work receiving dies, means to actuate the work support to move the work receiving dies from the loading station to the welding station, means to move the work support toward the complementary die to close a respective work receiving die against the complementary die at the welding station to form a sealed welding chamber surrounding the respective workpiece to be welded, clamping blocks slidably mounted in each work receiving die to one side of the welding chamber, resilient means normally urging each clamping block away from the welding chamber a spring loaded actuator rod slidably mounted in each work receiving die and secured to the work support, one end of each rod being chamfered to establish a clamping surface disposed for engagement with the outer ends of the blocks and the other end of each rod extending from the work receiving die toward the work support, resilient means disposed between the work receiving die and the work support to normally separate the work receiving die from the work support, the movement of the work support toward the complementary die to close the dies effecting compression of the resilient means between the work support and work receiving dies and movement of each actuator rod into engagement with a respective clamping block and consequent sliding movement of the blocks into engagement with the workpiece being welded to clamp it securely in place, a welding passageway extending between the dies when the latter are closed and in line with the weld line of the workpiece, at least one electron gun disposed in line with the passageway, and control means to actuate said gun when the dies are closed to establish an output beam through the passageway to the weld line to complete the weld of said workpieces.

2. In a high energy beam welding apparatus having a work support and a lifting table adapted to be raised from said work support, the combination comprising:
   an upper die assembly fixed to the high energy beam apparatus and having an upper work cavity and a beam passageway leading to said cavity from said welding apparatus;
   a lower die assembly mounted on said lifting table for vertical movement relative thereto and having a lower work cavity complementary to the upper cavity;
   resilient means between the lower die and the lifting table and continuously urging the lower die above the lifting table;
   clamping means at said lower work cavity for holding a work member in service; and
   clamp actuator means disposed below the lower surface of the lower die assembly, said clamp actuator means actuating said clamping means in response to the lower die assembly being depressed against said work support as said lower die assembly is moved into contact with said upper die assembly.

3. The apparatus of claim 2, and including:
   a valve mounted in said beam passageway; and
   valve actuator means for opening said valve after said clamping means are actuated and said dies are closed, said valve actuator means operating in response to engagement with said lifting table.

4. The apparatus of claim 3, wherein said valve actuator means is a spring loaded rod which depends downwardly from the upper die and engages the valve to normally hold said valve closed, the rod being depressible to open said valve when the lifting table engages the lower end of the rod.

5. In a high energy beam welding apparatus having a high energy beam source for welding elongated irregular shaped workpieces; the combination comprising:
- a first die assembly having a first die body which defines an elongated cavity in an outer surface thereof, said cavity being shaped to complement the irregular workpiece;
- an opposing die assembly mounted on the apparatus to be closed with said first die assembly and having a second die body which defines a second elongated cavity in a surface opposing the first die, said second cavity being shaped to complement the irregular workpiece;
- a housing mounted around the first die assembly and exposing said outer surface of the first die assembly, said housing extending outwardly from said outer surface and fitting over the second die body when the dies are closed, and the housing having a beam passageway defining a path through said housing along the elongated cavities from said beam source to the outer surface of the first die body;
- a shelf on said opposing die assembly and disposed to engage the outer end of said housing to stop the closing of the dies, and the dies defining a continuance of said beam passageway between the die bodies to said cavities;
- a valve disposed in said beam passageway; and
- valve actuator means on one of the die assemblies for engaging the other die assembly to open said valve.

References Cited

UNITED STATES PATENTS

| | | | |
|---|---|---|---|
| 1,504,088 | 3/1924 | Bransten | 219 - 129 X |
| 3,193,657 | 7/1965 | Gebauer | 219--72 X |
| 3,264,004 | 8/1966 | Sciaky | 219—121 X |
| 3,275,789 | 9/1966 | Lloyd et al. | 219—72 |
| 3,389,240 | 6/1968 | Sciaky | 219—121 |
| 3,391,268 | 7/1968 | Libby et al. | 219—124 |
| 3,401,249 | 9/1968 | Schleich et al. | 219—69 |
| 3,426,173 | 2/1969 | Steigerwald | 219—121 |
| 3,437,785 | 4/1969 | Sciaky | 219—121 |
| 3,440,392 | 4/1969 | Erlandson et al. | 219—121 |

FOREIGN PATENTS 1,045,405    10/1966    Great Britain.

JOSEPH V. TRUHE, Primary Examiner

R. E. O'NEILL, Assistant Examiner

U.S. Cl. X.R.

219—72, 160